Figure 1:
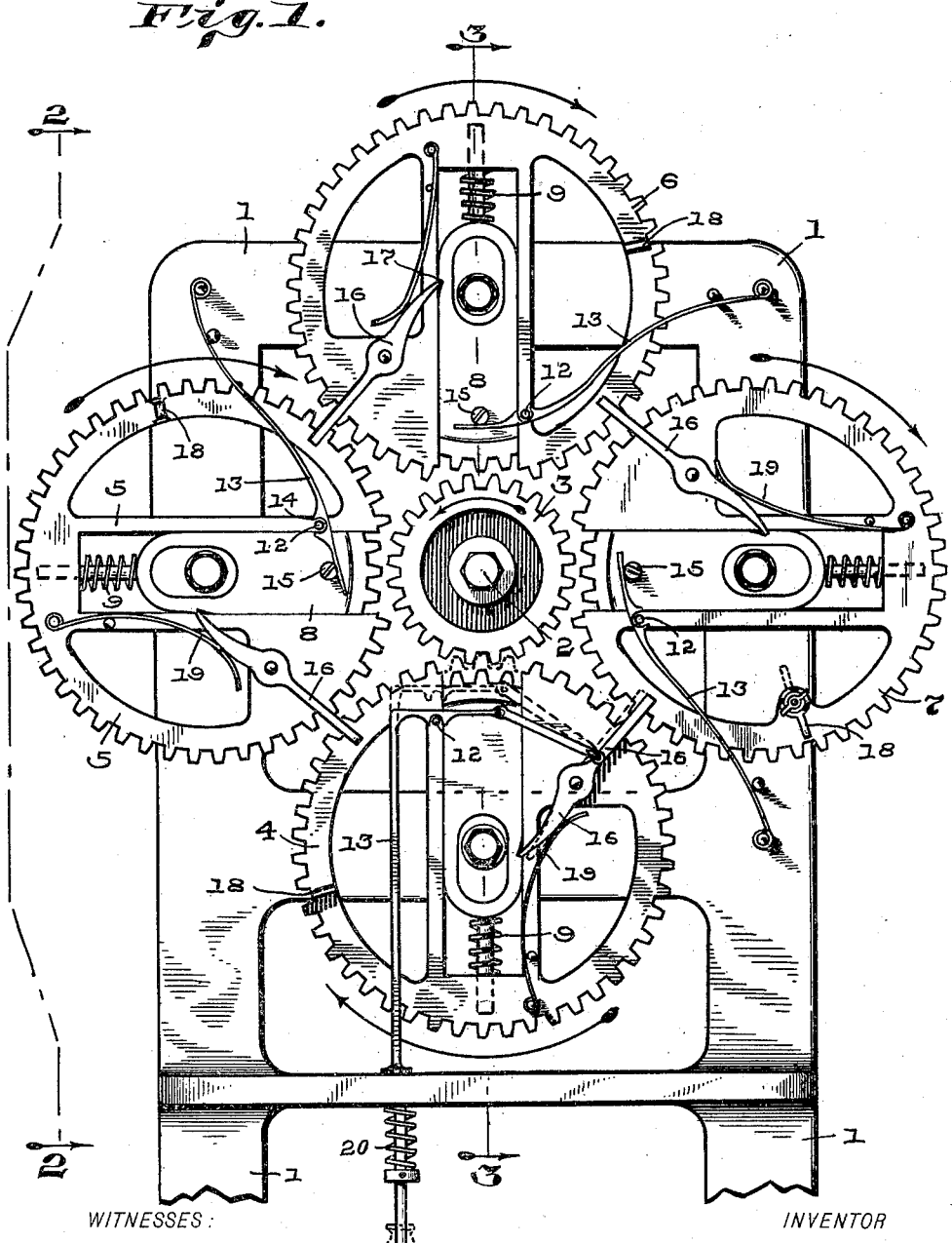

No. 629,027. Patented July 18, 1899.
B. T. BROWN.
MECHANICAL MOVEMENT.
(Application filed Aug. 6, 1898.)
(No Model.) 3 Sheets—Sheet 1.

WITNESSES:
G. A. Topp
J. C. Frohlich

INVENTOR
Braselton T. Brown,
BY
Frank W. Woerner.
ATTORNEY.

No. 629,027.  
B. T. BROWN.  
MECHANICAL MOVEMENT.  
(Application filed Aug. 6, 1898.)  
(No Model.)  
Patented July 18, 1899.  
3 Sheets—Sheet 2.
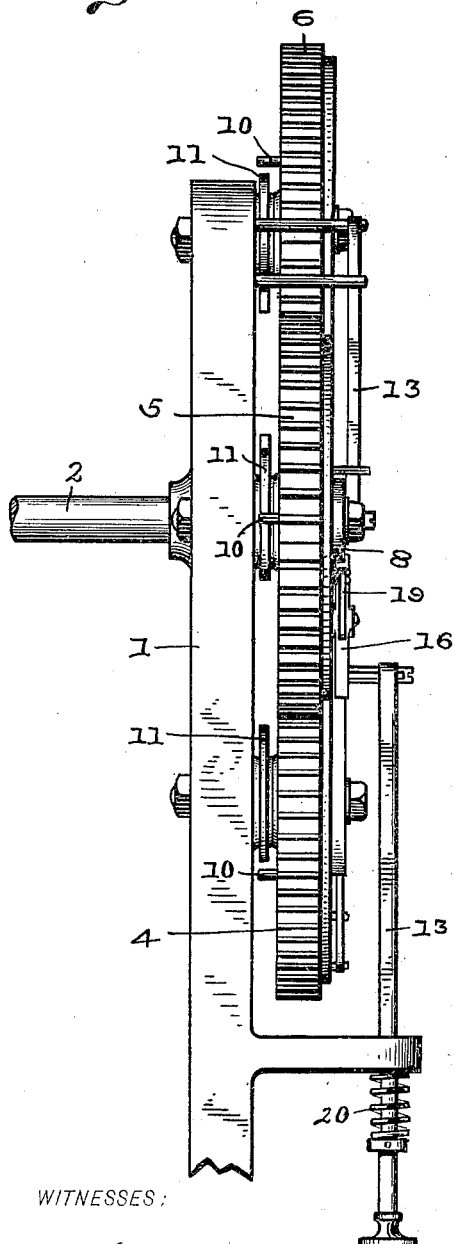
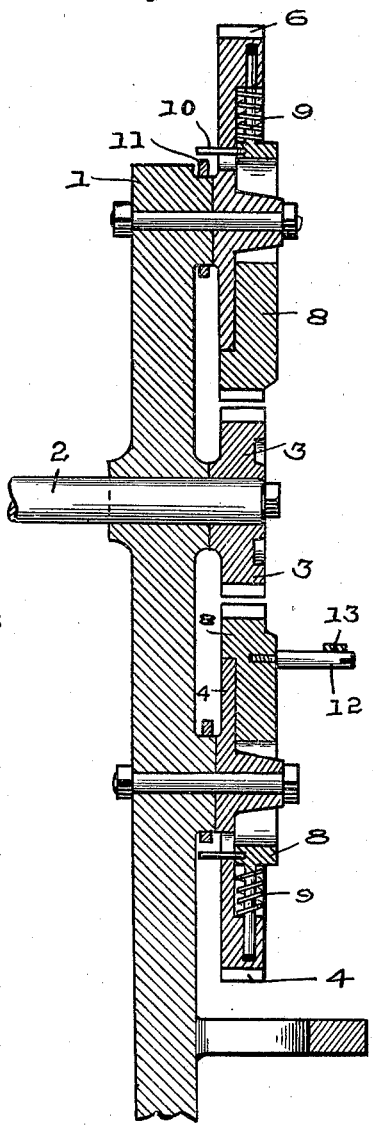
WITNESSES:  
G. A. Topp.  
J. C. Frohliger.
INVENTOR  
Braselton T. Brown,  
BY  
Frank W. Woerner.  
ATTORNEY.

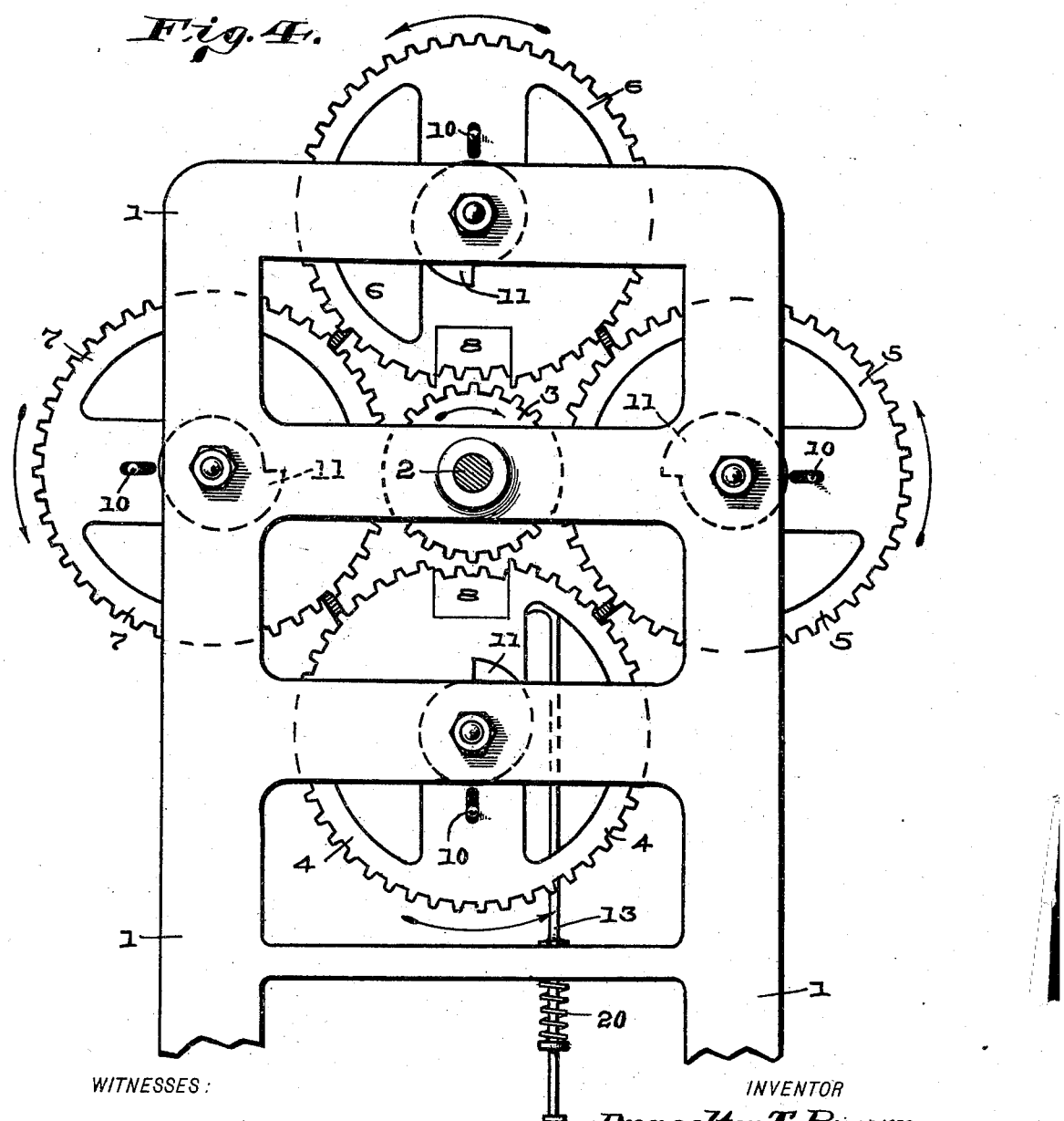

UNITED STATES PATENT OFFICE.

BRASELTON T. BROWN, OF INDIANAPOLIS, INDIANA, ASSIGNOR TO THE BROWN STRAW BINDER COMPANY, OF SAME PLACE.

MECHANICAL MOVEMENT.

SPECIFICATION forming part of Letters Patent No. 629,027, dated July 18, 1899.

Application filed August 6, 1898. Serial No. 687,965. (No model.)

*To all whom it may concern:*

Be it known that I, BRASELTON T. BROWN, a citizen of the United States, residing at Indianapolis, in the county of Marion and State of Indiana, have invented certain new and useful Improvements in Mechanical Movements, of which the following is a specification.

The object of my invention is to produce a mechanical movement by which a variety of movements can be secured by arranging a series of gears with slidable sections, all of which are located around a main driving-gear. This movement is particularly adapted to drop-hammers, where it is desired to have a stroke of the hammer in quick succession or at distinct intervals. There are other features that will be hereinafter more particularly described and claimed.

Referring to the accompanying drawings, which are made a part hereof and on which similar numerals of reference indicate similar parts, Figure 1 is a front elevation of my invention, showing the main driving-gear disconnected from the sectional gears. Fig. 2 is a side elevation of the same as looking in the direction indicated by the arrows on the line 2 2 in Fig. 1. Fig. 3 is a vertical central section as looking in the direction indicated by the arrows on the line 3 3 in Fig. 1, and Fig. 4 a rear or back view of the same.

In the drawings, 1 is the framework to which all the mechanism is attached. The framework may be of any desired construction, that being regulated by the application to the different machines on which it may be employed.

2 is the main driving-shaft on which the gear 3 is mounted. This gear 3 and the shaft 2 are running continually.

4, 5, 6, and 7 are sectional gears and, as shown in the drawings, are placed at a vertical and horizontal line from the center of the main driving-shaft 2.

I have shown four sectional gears in the drawings; but I do not desire to limit myself to any number, as in certain machines two may be sufficient, while in others five or six may be found necessary. Different-sized gears may also be employed.

8 is a slidable section of the gear and has at its periphery teeth that correspond with the remaining teeth on the main body of the gear, and when it is thrown in its extreme outer position, as shown in the dotted position on the gear 4, (see Fig. 1,) the gear 4 is a complete gear, in which state it remains until it has made one revolution, when it converts itself into a sectional gear, all of which will be more clearly hereinafter set forth.

The sliding section 8 is embedded in a groove in the gear 4, in which groove it slides back and forth. The extreme outer end of the section 8 develops into a round rod, which rod slides in a hole below the surface of the main body of the gear. This hole is situated at the end of the groove and by which means a guide for the section 8 is secured. Around the outer end of the section 8, which terminates in a spindle, a coil-spring 9 is wound. The tendency of this spring is to force the section 8 when released toward the main driving-gear 3, which in turn causes the gear 4 to revolve. The gear 4 after making one revolution is prevented from going farther by being thrown out of engagement with the main driving-gear. This disengagement is accomplished through a small stud 10, which is attached to the rear side of the slidable section 8. The stud 10 projects through a slot in the main body of the gear 4 and to such a distance above the surface thereof as to come into contact with a rigidly-mounted cam 11, which cam is secured to the framework 1, all of which is best shown in Fig. 4. Each gear is provided with a stud 10, which in turn comes into contact with a cam 11. The termination of the movement of the gear 4 is when the gear has made one revolution, thus bringing the slidable section 8 back into position, so that it can engage with the main driving-gear 3 when the proper time comes for its release. Now to insure that the gear 4 will stop at the same point at the end of its revolution a positive position is secured by attaching to the face of the gear 4 a stud 12. Leaf-springs 13, which are rigidly secured to the frame 1, (excepting the one on the gear 4,) extend over and above the surface of the gears. These springs 13 have a notch 14 cut into their surface, as shown, and which are so arranged as to lie in the path or orbit of the stud 12, attached to the gear. When the stud 12 and the notch 14 engage, the spring 13, which has been raised slightly by the stud bearing against the thickened or raised face which forms the notch 14, surrounds said stud 12 and holds the same. The release of this stud from the notch 14 is accomplished by means of the stud 15, attached to the surface of the slidable section 8, and is accomplished during the same operation when the section 8 advances toward the gear 3. When the slidable section 8 is forced out of engagement with the main gear 3, which, as stated before, is accomplished by the stud 10 and the cam 11, to prevent the return of this section in its outermost position a pawl 16, which is attached to the face of the main body of the gear, engages with a notch 17, which notch is located in the side of the slidable section 8. The outer end of the pawl is extended or drawn out to a point until it extends a short distance over the surface of the adjacent gear. Attached to the surface of each gear is a small projection or stud 18, which stud is integral therewith, (excepting the one attached to the gear 7, where it is made separately, the reason for which will hereinafter be described.) These studs 18 are designed to come in contact with the extended portions of the pawls 16 on the adjacent gear, which dislodges the pawl from the notch 17, which is located in the side of the slidable section 8, which releases said section and allows it to engage with the gear 3, causing the sectional gear to revolve. Thus it will be seen that the pawl 16 serves the purposes, first, of securing the sliding section 8 when it is forced back to a point where the notch 17 in its side engages with the pawl, and, second, of releasing the section. The pawls 16 are held against the sliding section 8 by means of the springs 19.

The stud 18 on the gear 7 is not made integral with said gear. It is pivoted thereon and is held down by a wing-nut, the object being that as there are times when it is not desired to have this stud 18 come in contact with the pawl 16 on the sectional gear 4, these parts will not come in contact with each other when the stud is turned as indicated by the dotted position, as best shown in Fig. 1.

The gear 4 is the starting-point. Ordinarily the series of gears are to make one revolution, each gear making a complete revolution itself and each commencing at different periods. This is accomplished by raising the rod 13 on the gear 4 either by hand or foot power. This releases the slidable section 8 of the gear 4, which then engages with the main gear 3. By the same movement which raises the rod 13, through a link connection which connects said rod with the pawl 16, the pawl is disengaged, giving the gear 4 an unobstructed opportunity to revolve. The rod 13 is released and returns to its former position under the tension of the spring 20. After the gear 4 has started and the stud 18 on its surface comes into contact with the pawl 16 on the adjacent gear the same is tripped, thereby causing that gear to revolve. So one gear after another revolves and at the end of each individual revolution stops. When the adjustable stud 18 on the gear 7 is turned, as shown in the dotted position, it cannot come into contact with the pawl on the gear 4. Consequently the pawl is not actuated and a repetition adverted. When it is desired to have a series of operations of the gears, the rod 13 is simply held in its raised position far enough that the notch 14 therein will not engage with the stud 12; but at the same time the pawl 16 is still far enough extended over the adjacent gear so as to come in contact and be tripped by the stud 18 on the gear 7, this stud 18 being in the position as shown in full lines. Thus the gears continue to go a series of operations of stopping and starting, thereby allowing the connections that are made from the machine to which this device is attached to perform such work as may be desired.

I describe the operation of this movement as follows: The gear 3, which is mounted on the main shaft 2, is belted to a continually-running pulley. The rod 13, operating over the gear 4, is raised and, through a link connection with the pawl 16, the pawl is thrown out of engagement with the notch 17 in the side of the slidable section 8. This section under the tension of the spring at its lower or outer end is forced into engagement with the main gear 3, thus causing the sectional gear 4, which is now a complete gear through the changing of the position of the slidable section 8, to revolve. When the gear 4 has revolved far enough to allow the stud 18 on its surface to come into contact with the pawl 16 on the gear 5, the tripping of said pawl causes the gear 5 to revolve, and so in turn each gear is connected to and disconnected from the gear 3. While each gear is making its revolution the stud 10 at the proper time starts to ascend the face of the cam 11, which disconnects the sectional gears from the gear 3. It will be readily seen that a variety of movements can be secured by the employment of my device.

Having thus fully described my said invention, what I desire to secure by Letters Patent of the United States is—

1. A mechanical movement, comprising a main driving-gear, a series of sectional gears surrounding the same, a slidable section mounted in ways in each gear which engage at intervals with the main driving-gear; a stud attached on the rear thereof, a cam fixed to the framework, whereby the slidable sections are actuated, substantially as described and for the purposes specified.

2. A mechanical movement, comprising a main driving-gear, a series of sectional gears surrounding the same; a stud 12, attached to the surface of each gear, a spring 13 secured to the framework at one end, and having a notch adapted to engage said stud, locking and determining the length of rotation of the gears, substantially as shown and described.

3. A mechanical movement, comprising a main driving-gear, a series of sectional gears surrounding the same, each of which has a slidable section mounted therein, each section terminating at its outer end in a spindle, a spring surrounding said spindle, the ends of which bear against the main body of the gear and the slidable section, and adapted to move the same into engagement with the main driving-gear, substantially as shown and described.

4. A mechanical movement, comprising a main driving-gear, a series of sectional gears surrounding the same, each of which has a slidable notched section mounted therein; a pawl 16, one end of which is adapted to engage with said notch and a stud for disengaging said pawl, substantially as described and for the purposes set forth.

5. A mechanical movement, comprising a main driving-gear, a series of sectional gears surrounding the same, each of which has a slidable section therein, a stud 15, mounted on the surface of the slidable section, a spring adapted to engage with said stud, said stud actuating said spring, whereby the release of said gear is accomplished, substantially as described and for the purposes set forth.

6. A mechanical movement, comprising a main driving-gear, a series of sectional gears surrounding the same and each of which has a stud 18; a pawl on the adjacent gear to come in contact with said stud, disengaging said pawl from a notch in the side of the slidable section of the gear; a spring pressing against one end of said section, substantially as shown and for the purposes set forth.

7. In a mechanical movement, comprising a main driving-gear, a series of sectional gears surrounding the same, cams rigidly secured to the framework, studs attached to the slidable sections of the gears and so situated as to come in contact with the cams and actuating the same, thereby shifting the position of the slidable sections, substantially as described and for the purpose specified.

In witness whereof I have hereunto set my hand and seal at Indianapolis, Indiana.

BRASELTON T. BROWN. [L. S.]

Witnesses:
JAMES E. NELSON,
M. G. HARDIN.